Figure 1:
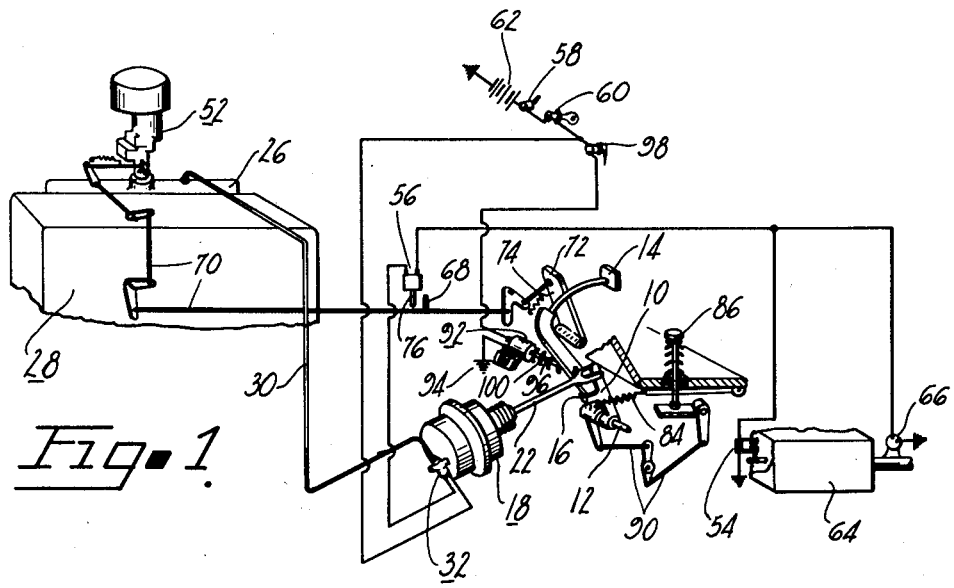

July 4, 1950   G. O. AINSWORTH   2,513,439
IMMOBILIZING MECHANISM FOR CLUTCH PEDALS
Filed Nov. 8, 1947

INVENTOR.
GEORGE O. AINSWORTH
BY
*H. O. Clayton*
ATTORNEY

Patented July 4, 1950

2,513,439

UNITED STATES PATENT OFFICE 2,513,439

IMMOBILIZING MECHANISM FOR CLUTCH PEDALS

George O. Ainsworth, South Bend, Ind., assignor to Bendix Aviation Corporation, South Bend, Ind., a corporation of Delaware Application November 8, 1947, Serial No. 784,871

9 Claims. (Cl. 192—91)

This invention relates in general to the controls of the power plant of an automotive vehicle and is particularly applicable to a mechanism for operating the clutch mechanism of the power plant.

The friction clutch of certain automotive vehicles has, for many years past, been automatically operated by power means including a pressure differential operated motor; and with certain of said mechanisms the clutch is automatically disengaged, to facilitate an operation of the change speed transmission of the vehicle, when the accelerator is released, the transmission at the time being established in any gear except high gear.

Now this well known and much used clutch control mechanism also includes a lost motion connection between the clutch pedal and a power operated clutch operating crank said connection being provided both to make possible a manual operation of the clutch in the event of failure of the power means and to eliminate the undesirable movement of the clutch pedal with each operation of said power means.

My invention is directed to an improvement of the above discussed clutch control mechanism said improvement consisting of means, operable at the will of the driver, for moving the clutch pedal out of sight when the clutch control mechanism is functioning to operate the clutch. There is thus provided a clutch control mechanism serving both to operate the clutch and to increase the leg room in the driver's compartment when said mechanism is in use; and a further object of my invention is to improve the latter mechanism by the provision of manually operated means, preferably including a small treadle member, for returning the clutch pedal to its clutch released position.

Yet another object of my invention is to provide manually and power operated means, operative at the will of the driver, for temporarily rendering the clutch pedal of a car incapable of performing its normal function; and in one embodiment of my invention there is suggested the use of a clutch pedal operating tension spring movable to one side or the other of a dead center position and operative, in cooperation with a manual operation of the pedal, to move said pedal either to its clutch engaged position or to its clutch disengaged position.

Yet another object of my invention is to provide means, operable at the will of the driver, for moving a control pedal out of the driver's compartment of an automotive vehicle and for maintaining said pedal in position out of said compartment, and therefore out of sight, until the driver decides to return the pedal to its released position within the compartment.

A further object of my invention is to provide, in the power plant of an automotive vehicle, manually and power operated means for operating the friction clutch of the power plant, said means including a clutch operating crank, a manually operated clutch pedal contactable with the crank, power means operative to move the clutch pedal out of range of contact with the crank and to operate the crank to operate the clutch, and means operative (1) to maintain the clutch pedal in its clutch disengaged position after the pedal has been moved to said position to increase the leg room of the driver's compartment of the vehicle and (2) operative to return the pedal to its clutch engaged position, that is, its position within the driver's compartment.

The above and other objects and features of the invention will appear more fully hereinafter from a consideration of the following description taken in connection with the accompanying drawings wherein one embodiment of the invention is illustrated by way of example.

Figure 2:
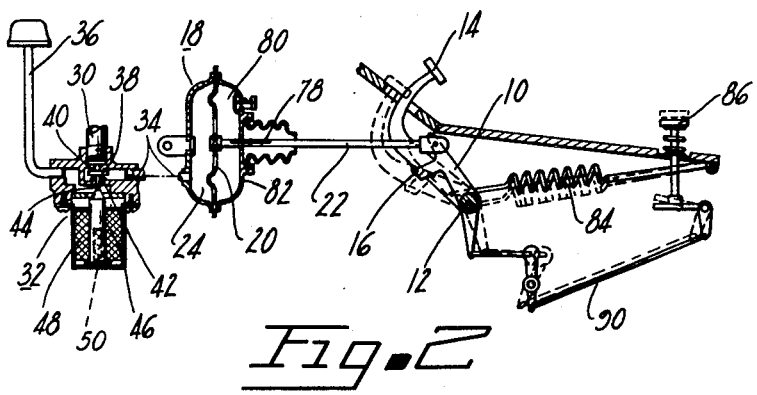

In the drawings Figure 1 is a diagrammatic view disclosing the details of a preferred embodiment of my invention; and Figure 2 is a view disclosing details of the power operated clutch control mechanism of Figure 1 and details of the spring means for biasing the clutch pedal to one or the other of its operative positions.

Referring now to the two figures of the drawing disclosing a preferred embodiment of my invention there is provided a crank 10 keyed to a clutch throughout shaft 12; and when this crank is rotated counterclockwise, Figure 1, the shaft 12 is rotated to disengage the clutch of the power plant of the vehicle. This clutch, which is not disclosed in the drawings, may be of the conventional friction type including driving and driven members. A manually operated clutch pedal 14 is rotatably mounted, intermediate its ends, on the shaft 12 and is adapted to contact a flange 16 extending laterally from and secured to the crank 10. There is thus provided a lost motion connection between the crank 10 and the pedal 14 there being no movement of the latter when the former is actuated to operate the clutch.

The crank 10 is preferably power operated to operate the clutch and there is disclosed, in Figure 1, one of the several well known clutch operating power means now in use. This power means includes a single acting pressure differential operated motor 18 comprising a power element 20 operably connected to the crank 10 by a rod 22. The pressure of the air within the control compartment 24 of the motor is adapted to be controlled by a connection with the intake manifold 26 of the internal combustion engine 28 of the vehicle. To this end there is provided a conduit 30 connected at one of its ends with the intake manifold and at its other end with a solenoid operated three way valve 32; and the latter valve is connected to the control compartment 24 by a conduit 34.

As is disclosed in Figure 2 the three way valve 32 includes a casing ported to receive the conduits 30 and 34 and to receive a conduit 36 leading to an air cleaner, not shown. A valve member 38, adapted to seat at 40 to connect the control compartment 24 with the atmosphere or to seat at 42 to connect said compartment with the manifold, is mounted on the upper end of a stem 44 which is connected to the armature 46 of a solenoid 48. When the solenoid is energized the valve member 38 is moved downwardly, Figure 2, to seat at 42 thereby connecting the control compartment 24 of the motor 18 with the manifold to energize said motor; and when the solenoid is deenergized a spring 50 serves to seat the valve member 38 at 40 to vent the control compartment to the atmosphere thereby deenergizing the motor. As is well known to those skilled in this art the intake manifold 26, by virtue of the operation of the throttle valve of the carburetor 52 and by virtue of the pumping action of the engine cylinders, becomes a source of vacuum to make possible an operation of the clutch operating pressure differential operated motor 18.

The energization of the three way valve controlling solenoid 48 is controlled by electrical means including, in series with said solenoid, a normally closed and grounded transmission operated breaker switch 54, an accelerator operated breaker switch 56, a cutout switch 58, the ignition switch 60 of the ignition system of the vehicle, and a grounded battery 62. The transmission operated breaker switch is biased to a closed position and is opened by transmission mechanism, for example the second and high gear shift rail, when and only when the transmission is established in its high gear setting. The transmission disclosed in the drawings is preferably of the three speeds forward and reverse type and is indicated by the reference numeral 64. The electrical means for controlling the solenoid 48 also preferably includes a grounded vehicle speed responsive governor operated switch 66 said switch being connected in parallel with the grounded transmission operated switch 54. The switch 66 is closed when the vehicle is at a standstill or is traveling below a certain speed.

As is disclosed in Figure 1 the accelerator operated breaker switch 56 is operated by a thrust member 68 connected to a part of linkage 70 which interconnects the accelerator 72 with the throttle valve, not shown. When the accelerator is released, by the operation of a return spring 74, the member 68 moves away from a switch operating member 76 thereby permitting the switch 56 to close; and when the accelerator is depressed, to open the throttle and effect a clutch engaging operation of the power means, the member 68 contacts the member 76 thereby effecting an opening of the switch 56. All four of the breaker switches 54, 56, 58, and 66 are of well known breaker switch construction accordingly the same are not described in detail in the drawings.

Describing now the operation of the clutch operating power means and completing the description of parts of said mechanism not heretofore described, when the accelerator is released to close the switch 56, the transmission is established in high gear and the vehicle is traveling below the aforementioned governor speed there results an operation of the valve 32 to effect an energization of the motor 18 to disengage the clutch. This clutch disengaging operation of the motor 18 is also effected when the accelerator is released and the transmission is at the time established in any gear except high gear.

To effect an engagement of the clutch, for example after an operation of the transmission, the driver depresses the accelerator thereby opening the switch 56; and this operation results in a closing of the valve 32 thereby venting the motor 18 to the atmosphere to effect a clutch engaging operation of said motor. The latter operation may be carried out in two stages, the first stage being effected by the operation of a slot 78 in the rod 22 said slot controlling the rate of egress of air from a compartment 80 of the motor 18 when the clutch springs, not shown, are operating to engage the friction clutch. The second and relatively slow stage of clutch engaging operation of the motor 18 is effected by the egress of air from a bleed opening 82 in the casing of the motor said operation being effected after the aforementioned first stage operation is completed.

Describing now the essence of my invention there is provided a mechanism, operative at the will of the driver, for maintaining the clutch pedal 14 in its clutch disengaged position and then for returning the pedal to its clutch engaged position. Such a mechanism provides means for increasing the leg room of the driver's compartment when the above described power means is operative to operate the clutch; for with the inclusion of the above described lost motion connection between the clutch pedal 14 and the crank 10 there is provided manually operative means for operating the clutch in the event of failure of the power means. However, this manually operated means, that is the pedal 14, is stationary and has no useful purpose when the power means is functioning to operate the clutch; accordingly it is desirable, at this time, to depress the clutch pedal 14 so that its toe portion will nest within the floor board of the driver's compartment thereby increasing the leg room within said compartment and improving the appearance of the compartment.

To this end there is provided a tension spring 84 pivotally connected at one of its ends to the floor board of the driver's compartment and at its other end to the clutch pedal at a point adjacent the pivotal mounting of said pedal upon the clutch throwout shaft 12. The spring 84, as disclosed in Figure 2, serves to bias the pedal 14 either to its clutch engaged or its clutch disengaged position this biasing operation being initiated immediately after said spring passes its dead center position with respect to the fulcrum of the clutch pedal. Thus when the pedal 14 is in its clutch engaged position disclosed in full lines in Figure 2, the spring 84 tends to hold said pedal in this position; and when the pedal is in its clutch disengaged position, that is the position disclosed in dotted lines in Figure 2, the spring again functions to hold the pedal in the latter position.

To move the pedal to its clutch engaged position from its clutch disengaged position the driver depresses a spring return treadle 86 which is preferably mounted in the floor board of the driver's compartment immediately to the rear of the clutch pedal. The lower end of the treadle 86 is adapted to contact one end of a bell crank lever constituting a part of force transmitting linkage 90 interconnecting the lower end of the clutch pedal with the treadle. There is thus provided, in the treadle operated force transmitting linkage 90 and the dead center spring 84, a manually operated means, operable at the will of the driver, for moving the clutch pedal of a car out of sight and for returning said pedal to its normal position in the driver's compartment.

When the clutch is being power operated it is necessary to bodily move the clutch pedal laterally out of the path of movement of the flange 16 of the clutch operating crank 10; and with the mechanism of my invention this is effected by a motor, preferably an electrical motor 92, which cooperates with the above described clutch operating power means. This motor, which is grounded at 94, is connected to the pedal 14 by a rod 96 and is wired to a manually operated breaker switch 98 which is preferably mounted in the instrument board of the driver's compartment; and the latter switch is in turn wired to the electrical connection between the ignition switch 60 and the solenoid 48. There is thus provided, in the motors 92 and 18 and control means thereof, power means for simultaneously disengaging the clutch and moving the clutch pedal to a position so that having been depressed said pedal will remain out of sight during the power operation of the clutch. The floor board of the driver's compartment is slotted to accommodate the aforementioned lateral movement of the pedal 14 and the depression thereof to its disengaged position.

The clutch being disengaged by the power means and the pedal 14 being in its depressed position, said pedal is then returned to its normal position within the driver's compartment by first opening the switch 98 thereby permitting a spring 100 to expand to move the pedal to the right, Figure 1, whereupon the driven then depresses the treadle 86 to return the pedal to its clutch engaged position.

There is thus provided, by the mechanism of my invention, a manually operated mechanism for moving a control member of the power plant of an automotive vehicle to a certain position, maintaining said member in this position, and then, at the will of the driver, returning the pedal to its normal position. When this control member is a part of the clutch control mechanism of the power plant there is provided means for increasing the leg room in the driver's compartment in the vehicle and for improving the appearance of said compartment during the power operation of the clutch.

Although only one embodiment of the invention has been illustrated and described, various changes in the form and relative arrangements of the parts may be made to suit requirements.

I claim:

1. A control pedal mechanism adapted to be mounted in and adjacent the driver's compartment of an automotive vehicle including a control shaft, a pedal pivotally mounted on said shaft at a point intermediate the ends of the pedal, said pedal, at one of its ends, being adapted to extend within the aforementioned compartment; a tension spring pivotally connected at one of its ends to a portion of the pedal adjacent the aforementioned pivotal mounting and adapted to be pivotally connected, at its other end, to a support, a manually operated treadle member adapted to be mounted adjacent the pedal, and force transmitting linkage interconnecting the lower end of the pedal with the lower end of the treadle member.

2. The combination with the driver's compartment of an automotive vehicle, of a control pedal mechanism mounted adjacent to and having parts thereof extending within said compartment, said mechanism including a control shaft, a pedal pivotally mounted, intermediate its ends, upon said shaft, a tension spring member pivotally connected, at one of its ends, to the base of the driver's compartment and pivotally connected at its other end to a portion of the pedal lying immediately adjacent the aforementioned pivotal mounting, a manually operated spring returned treadle member mounted in the base of the compartment, and force transmitting linkage pivotally connected at one of its ends to the lower end of the pedal and contacted, at its other end, by the lower end of the treadle.

3. In a control mechanism constituting a part of the power plant of an automotive vehicle, the combination with a power operated crank, of a manually operated pedal adapted to contact said crank, and means, including a spring connected to the pedal and a thrust member also connected to said pedal, operable to maintain said pedal in one of the other of two positions and also operable to overcome the operation of the spring in its operation of biasing the pedal to one of its two positions.

4. In an automotive vehicle provided with a clutch and means for operating the clutch including a crank, power means for operating the crank to effect a disengagement of the clutch and a controlled engagement thereof, a manually operated clutch pedal having a disconnected engagement with the crank and thereby providing means making possible a power operation of the clutch without effecting a movement of the clutch pedal, said pedal however being operable to effect, at the will of the driver, a manual operation of the clutch; and manually operable means for maintaining the clutch pedal in its clutch disengaged position and for returning said pedal to its clutch engaged position.

5. In an automotive vehicle provided with a clutch and means for operating the clutch including a crank; power means for operating the crank to effect a disengagement of the clutch and a controlled engagement thereof, a manually operated clutch pedal having a disconnected engagement with the crank and thereby providing means making possible a power operation of the clutch without effecting a movement of the clutch pedal said pedal however being operable to effect, at the will of the driver, a manual operation of the clutch; and manually operable means, including a spring, a manually operated treadle member and force transmitting linkage interconnecting the latter member and pedal, for maintaining the clutch pedal in its clutch disengaged position and for returning said pedal to its clutch engaged position.

6. In an automotive vehicle provided with a friction clutch and power means for operating the clutch including a crank, a pressure differential operated motor operably connected to the crank, and valve means for controlling the operation of the motor; a manually operated clutch pedal adapted, when depressed, to contact the crank and thereby disengage the clutch, and power and manually operated means for operating and controlling the operation of said clutch pedal to position the pedal in a certain position when the clutch is being power operated and to return said pedal to its clutch engaged position, said means including means for moving the pedal out of the path of the crank, means for maintaining said pedal in one or the other of two positions, and means for returning the pedal to its clutch engaged position.

7. A mechanism for operating the friction clutch of an automotive vehicle including a clutch operating crank, a manually operated clutch pedal contactable with said crank and movable to either a clutch disengaged or a clutch engaged position, power means for operating the crank to disengage the clutch, control its engagement, and bodily move the clutch pedal laterally thereby changing its path of movement so that it will not contact the crank when moved out of its clutch disengaged position; and means for maintaining the clutch pedal in its clutch disengaged position and for returning said pedal to its clutch engaged position.

8. A mechanism for operating the friction clutch of an automotive vehicle including a clutch operating crank, a manually operated clutch pedal contactable with said crank and movable to either a clutch disengaged or a clutch engaged position; power means including a pressure differential operated motor connected to the crank and a motor connected to the clutch pedal, for operating the crank to disengage the clutch, control its engagement, and bodily move the clutch pedal laterally thereby changing its path of movement so that it will not contact the crank when moved to its clutch disengaged position; and means for maintaining the clutch pedal in its clutch disengaged position and for returning said pedal to its clutch engaged position.

9. A mechanism for operating the friction clutch of an automotive vehicle including a clutch operating crank, a manually operated clutch pedal contactable with said crank and movable to either a clutch disengaged or a clutch engaged position, power means, including a pressure differential operated motor connected to the crank and a motor connected to the clutch pedal, for operating the crank to disengage the clutch, control its engagement, and bodily move the clutch pedal laterally thereby changing its path of movement so that it will not contact the crank when moved to its clutch disengaged position; and means for maintaining the clutch pedal in its clutch disengaged position and for returning said pedal to its clutch engaged position including a tension spring connected to the pedal and force transmitting means operative to overcome said spring.

GEORGE O. AINSWORTH.

REFERENCES CITED

The following references are of record in the file of this patent:

UNITED STATES PATENTS

| Number | Name | Date |
|---|---|---|
| 1,540,247 | Bowman | June 2, 1925 |
| 2,025,854 | Freeman | Dec. 31, 1935 |
| 2,110,265 | Gillett | Mar. 8, 1938 |
| 2,194,040 | Wemp | Mar. 19, 1940 |